Dec. 19, 1933.  E. WATTS ET AL  1,940,110
LUBRICATING SYSTEM FOR WORM AND WORM WHEEL DRIVE
Filed July 11, 1930

INVENTORS E. WATTS
C. E. STANLEY
BY G. H. Heydt
ATTORNEY

Patented Dec. 19, 1933

1,940,110

UNITED STATES PATENT OFFICE 1,940,110

LUBRICATING SYSTEM FOR WORM AND WORM WHEEL DRIVE

Edward Watts and Clifford E. Stanley, Aldwych, London, England, assignors to Electrical Research Products Inc., New York, N. Y., a corporation of Delaware Application July 11, 1930, Serial No. 467,215, and in Great Britain February 18, 1930

7 Claims. (Cl. 184—11)

This invention relates to lubricating systems for enclosed driving gears.

It has been found that in the operation of gear drives enclosed in a housing, the rotation of certain types of gears tends to cause the lubricant to be forced toward one end of the housing. This results in a deficiency of lubricant at one end of the housing and an excess of lubricant at the other end. In enclosed worm drives in which the worm shaft is carried in bearings located in the ends of the housing the action of the worm gear tends to rob one bearing of its lubricant and to supply an excess of lubricant to the alternate bearing.

The object of this invention is therefore to provide means whereby the excess lubricant forced to one bearing by the action of the gears may be taken therefrom for use in lubricating the alternate bearing.

According to the present invention the two ends of an enclosed gear housing are interconnected by a conduit through which the lubricant may flow from that end at which it tends to accumulate in excess to the alternate end of the housing. When the invention is applied to worm and worm wheel drives in which the worm shaft is supported in bearings in the housing, the conduit may communicate with the bearing surfaces of the bearings so that the oil fed in excess to one bearing is drained therefrom and flows through the conduit to the other bearing. Furthermore, wicks may be included in the ends of the conduit and may be pressed into engagement with the worm gear shaft by springs so that the one wick tends to remove the excess oil from one bearing and another wick feeds oil to the alternate bearing.

Figure 1:
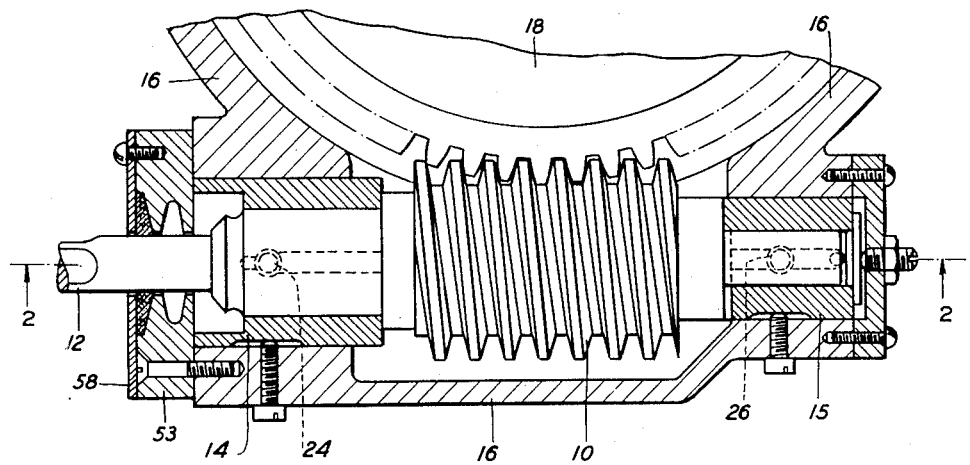
Figure 2:
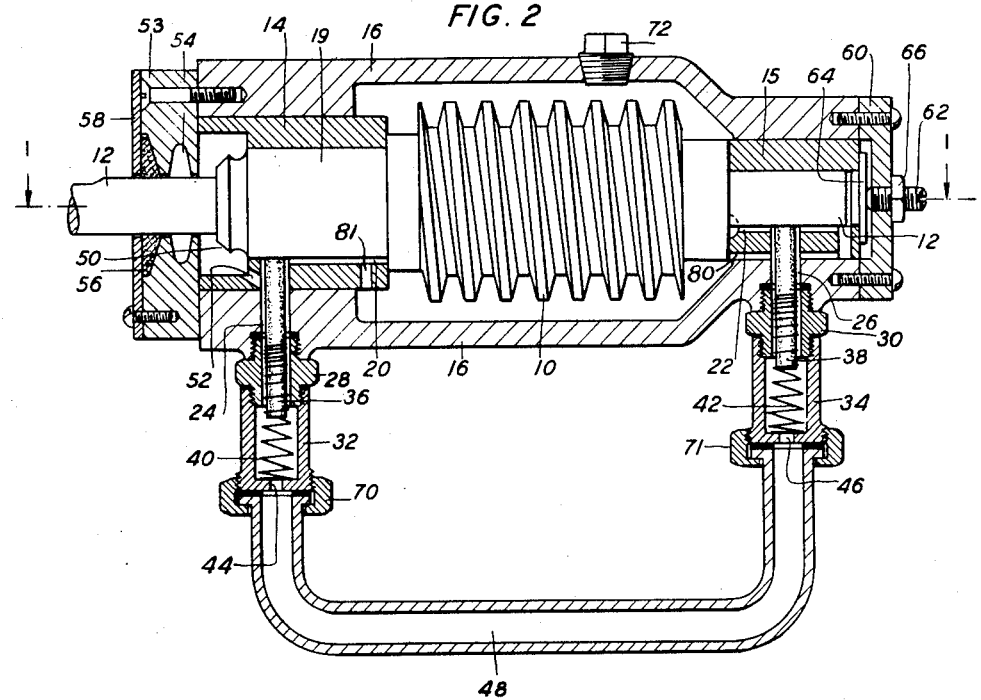

In the illustrated embodiment, Fig. 1 is a horizontal sectional view of an enclosed worm and worm wheel drive and Fig. 2 is a view partly in elevation and partly in section showing the method of lubricating the bearings according to the invention.

Referring now to the accompany drawing, a worm 10 is mounted upon a shaft 12 which is carried in bearings 14 and 15 which are supported in the housing 16. The worm wheel 18 engages and is driven by the worm 10. The bearing 14 is provided with lubricating channels or recesses 20 and 81. The bearing 15 is provided with lubricating channels or recesses 22 and 80. The lubricating channels or recesses 20, 81 and 22, 80 communicate with holes 24 and 26 respectively extending through the bearings and into the interior of the housing.

Nipples 28 and 30 are screwed into the housing to register with the holes 24 and 26 respectively. Attached to the nipples are lubricant containers 32 and 34. Conduit 48 extends between the lubricant containers 32 and 34 and is attached thereto by couplings. The coupling 70 connects the conduit 48 with lubricant container 32 and the coupling 71 connects the conduit 48 with lubricant container 34. Wicks 36 and 38 are arranged in the holes 24 and 26 and are upwardly biased by springs 40 and 42 to bear against the shaft 12. Holes 44 and 46 are drilled in the bottoms of the lubricant containers 32 and 34 and communicate with conduit 48. The wick 36 extending upward through hole 24 to the enlarged portion 19 of shaft 12 is used for wiping the excess lubricant from the shaft in order that this lubricant be carried downward to the lubricant container 32 and conduit 48 to the alternate lubricant container 34. The wick 38 carried through hole 26 and bearing against shaft 12 carries the lubricant from container 34 to the shaft 12 and bearing 15. The enlarged portion 19 of the shaft 12 is provided with a sharp edged collar 50 which tends to throw off any lubricant traveling down the shaft. The lubricant thrown off by the collar 50 is delivered through the duct 52 into the hole 24. The housing 16 is provided with an end plate 53 having a recess 54 adapted to accumulate any excess lubricant which might creep beyond the inner surface of the plate 53. A second recess is provided in the plate 53 for packing which is compressed by cover plate 58 which serves to secure substantially fluid tight joint. At the alternate end of the housing 16 a cover plate 60 is provided which effects a fluid tight joint with the housing 16. An adjusting screw 62 bears against the end thrust bearing 64 adapted to withstand the endwise thrust of the worm. The adjusting screw 62 is locked in position by a lock nut 66.

The housing 16 is filled with oil or other lubricant to such a level that the lands of the worm dip in the lubricant and thus carry adequate lubrication to the point at which the worm and worm wheel engage. Sufficient lubricant is initially placed in the housing at filling plug 72 to compensate for the lubricant maintained in containers 32 and 34 and conduit 48. When the lubricant containers and conduit are thus filled the lubricant is maintained at the proper level in the housing 16. Rotation of the worm tends to pump the lubricant to the lefthand end of the housing 16 which process robs the bearing 15 of lubricant and causes an excess of lubricant in the bearing 14. There is normally a pronounced tendency to drive the lubricant out of the casing past the cavity at the lefthand end of the housing. Excess lubricant, however, is forced by this pressure into the recesses 81 and 20, down hole 24 and into the lubricant container 32 and conduit 48. The wick 36 by its biasing action also assists in carrying the lubricant into the hole 24 which constantly tends to remove the oil from shaft 12 and bearing 14 and divert it into the channel extending toward the bearing 15. The lubricant is thus delivered to container 34 and supplied both directly and through the agency of wick 38 to the shaft 12 and the bearing 15.

In addition to the provision for lubricating the righthand bearing 15 an important factor of this system resides in the relief of pressure at the lefthand end of the housing. Leakage of lubricant from the casing is thus effectively prevented since the pressure acting against the packing located in recess 56 is relieved by the continuous flow of the lubricant through the passages 24 and 52 to the lubricant container 32, conduit 48, lubricant container 34 and hole 26. The pressure ordinarily existing in this type of gear will with this system tend to drive the oil to the bearing 15. The pressure is, however, further relieved by the channels or recesses 22 and 80 leading into the lubricant chamber of the housing 16.

The conduit 48 and lubricant containers 32 and 34 may, if desired, be formed integral with the body of the housing 16, for example, by providing a cored hole in the casing forming the housing 16.

It will be appreciated that only one embodiment of the invention has been described and illustrated and that many modifications may be made without departing from the scope of the invention.

What is claimed is:

1. In combination, a worm and worm wheel drive, a housing for enclosing said worm and worm wheel drive having lubricant therein, a shaft for said worm, bearings for said shaft at each end of said worm fitted into said housing, an enclosed conduit interconnecting said two bearings, means for supplying one bearing with lubricant, means for forcing excess lubricant under pressure from said bearing into said conduit, and to the alternate bearing.

2. In combination, a worm and worm wheel drive, a housing for enclosing said worm and worm wheel drive having lubricant therein, a shaft for said worm, bearings for said shaft at each end of said worm fitted into said housing, a conduit interconnecting the two ends of said housing, wicks fitted into the ends of said conduit, means for supplying one bearing with lubricant, means including one of said wicks for draining excess lubricant from said bearing into said conduit, and means including a second one of said wicks for supplying said excess lubricant to the alternate bearing.

3. In a lubricating system, an enclosed housing for a worm and worm wheel drive having lubricant therein, bearings in each end of said housing having lubricant recesses opening into the interior of said housing, a shaft mounted in said bearings having a worm rigidly fixed thereto, the rotation of which forces the lubricant into the bearing in one end of said housing, a conduit interconnecting said two bearings, means for wiping excess lubricant from the shaft in said one bearing into which the lubricant is forced and causing it to flow into said conduit, and means associated with the alternate bearing communicating with said conduit for feeding said excess lubricant directly to the shaft in said alternate bearing.

4. In a lubricating system, an enclosed housing for a worm and worm wheel drive having lubricant therein, bearings in each end of said housing having lubricant recesses opening into the interior of said housing, a shaft mounted in said bearings having a worm rigidly fixed thereto, the rotation of which forces the lubricant into the bearing in one end of said housing, reservoirs communicating with each bearing, a conduit interconnecting said reservoirs, means for wiping excess lubricant from the shaft in said one bearing into which the lubricant is forced and causing it to flow into the reservoir communicating with said bearing whereby said lubricant enters said conduit for supplying lubricant to the alternate reservoir, and means in said alternate reservoir for feeding said lubricant to the associated shaft and bearing.

5. In combination, an enclosed housing for a worm and worm wheel drive having lubricant therein, bearings in each end of said housing having lubricant recesses opening into the interior of said housing, a worm mounted in said bearings and rotatable therein the rotation of said worm forcing the lubricant into the bearing in one end of said housing, a conduit interconnecting said bearings, and means for draining said lubricant from the bearing in which the lubricant is forced by the worm, into said conduit, thus causing a continuous flow of said lubricant from said bearing to the other bearing.

6. In combination, an enclosed housing for a worm and worm wheel drive having lubricant therein, bearings in each end of said housing having lubricant recesses opening into the interior of said housing, a shaft mounted in said bearings having a worm rigidly fixed thereto, the rotation of which forces the lubricant into the bearing in one end of said housing, a conduit interconnecting said two bearings and means including said conduit for supplying the second bearing with lubricant from excess lubricant taken into said conduit from said first bearing into which the lubricant is forced by the worm.

7. In a lubricating system, a gear mounted on a shaft, a housing for enclosing said gear and shaft having lubricant therein, bearings for said shaft at each end of said housing, a conduit interconnecting said bearings, means including said gear for supplying a lubricant to one bearing, means for withdrawing excess lubricant from the surface of the shaft in said one bearing and means including said conduit for applying said excess lubricant directly to the shaft mounted in the alternate bearing.

EDWARD WATTS.
CLIFFORD E. STANLEY.